United States Patent
Nakagata et al.

(10) Patent No.: US 7,848,591 B2
(45) Date of Patent: Dec. 7, 2010

(54) IMAGE PROCESSING APPARATUS, IMAGE PROCESSING METHOD, AND COMPUTER PRODUCT

(75) Inventors: Shohei Nakagata, Kawasaki (JP); Kensuke Kuraki, Kawasaki (JP); Kohji Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1021 days.

(21) Appl. No.: 11/641,862

(22) Filed: Dec. 20, 2006

(65) Prior Publication Data

US 2008/0037898 A1  Feb. 14, 2008

(30) Foreign Application Priority Data

Aug. 10, 2006  (JP) .............................. 2006-218591

(51) Int. Cl.
*G06K 9/40* (2006.01)

(52) U.S. Cl. .................... 382/275; 382/260; 382/274

(58) Field of Classification Search ................. 382/260, 382/274, 275, 282
See application file for complete search history.

(56) References Cited

U.S. PATENT DOCUMENTS

| | | | | |
|---|---|---|---|---|
| 5,236,326 A | * | 8/1993 | Grossa | 425/174.4 |
| 5,247,366 A | * | 9/1993 | Ginosar et al. | 348/256 |
| 5,388,036 A | * | 2/1995 | Stoppelkamp | 362/524 |
| 5,754,709 A | * | 5/1998 | Moriya et al. | 382/274 |
| 5,920,356 A | * | 7/1999 | Gupta et al. | 348/606 |
| 2008/0123998 A1 | | 5/2008 | Gomi et al. | |

FOREIGN PATENT DOCUMENTS

| | | |
|---|---|---|
| CN | 1806257 A | 7/2006 |
| JP | 11-177852 | 7/1999 |
| JP | 2003-204451 | 7/2003 |
| JP | 2004-201171 | 7/2004 |
| JP | 2005-333530 | 12/2005 |

OTHER PUBLICATIONS

Chinese Official Action dated Dec. 5, 2008 issued in the corresponding Chinese Application No. 200710004312.X.

\* cited by examiner

*Primary Examiner*—Yosef Kassa
(74) *Attorney, Agent, or Firm*—Fujitsu Patent Center

(57) ABSTRACT

An image processing apparatus includes a target-area setting unit that sets, in image data, an area around a target pixel as a target area, and an overshoot-undershoot suppressing unit that corrects a pixel value of the target pixel in the image data after processing based on pixel values of pixels in the target area.

12 Claims, 16 Drawing Sheets

IMAGE PROCESSING APPARATUS, IMAGE PROCESSING METHOD, AND COMPUTER PRODUCT

BACKGROUND OF THE INVENTION

1. Field of the Invention

The present invention relates to a technology for correcting a pixel value of a target pixel in image data.

2. Description of the Related Art

In image display apparatuses having brown tube display or liquid crystal display and in which an image is displayed in pixels, undershoot or overshoot occurs when an edge enhancement is performed to sharpen the edges of the displayed image. In overshoot the image has a white border upon edge enhancement and in undershoot the image has a black border upon edge enhancement. There have been various attempts to reduce the overshoot and undershoot caused by edge enhancement.

For example, in an image correcting circuit disclosed in Japanese Patent No. 3326377, pass filtering is applied to an input image according to a quantity of high-frequency components, making the degree of edge enhancement variable according to the quantity of high-frequency components, thus suppressing overshoot or undershoot and achieving edge enhancement according to the sharpness of the edges of the input image.

In Japanese Patent Application Laid-open No. 2003-204451, a device and method are disclosed in which Haar wavelet transform method is used for reducing overshoot and undershoot at the edges and to enhance the sharpness of the edges of the display image. Haar wavelet transform a type of wavelet transform and is the simplest of the wavelet transform in which wavelets that are enlarged, compressed and parallel-shifted are superimposed to express all possible waveforms.

In Japanese Patent Application Laid-open No. 2005-333530, an image signal processing apparatus is disclosed which receives a plurality of image signals near a target pixel of an input image signal as an input and extracts the signal of the target pixel, at least two pixels before and after the target pixel, and pixels for secondary differentiation further before and after the previous set of pixels. The image signal processing apparatus outputs a secondary differential signal by subjecting the plurality of extracted pixels to a secondary differentiation, and adds the secondary differential signal to the image signal of the target pixel to form a sum signal. The image signal processing apparatus then detects a maximum pixel value and a minimum pixel value of at least three pixels that include the target pixel and the signals before and after the target pixel and selects a median from among at least three signals that include the output signal, the signal with the maximum pixel value and the signal with the minimum pixel value. Consequently, the image signal processing apparatus suppresses overshoot and undershoot, and performs outline correction to satisfaction even if the input signal has an undulating outline and generates good image signals.

However, in the conventional technologies described above, it is difficult to maintain the sharpness of the edges while suppressing overshoot and undershoot.

Specifically, in the technologies disclosed in Japanese Patent No. 3326377 and Japanese Patent Application Laid-open No. 2003-204451, the sharpness of the edges varies according to the degree of suppression of overshoot-undershoot. Thus, if the degree of suppression of overshoot-undershoot is made mild, the sharpness of the edges is reduced, and if the sharpness of the edges is increased, the degree of overshoot-undershoot suppression is emphasized. Therefore, it is difficult to achieve both sharpness of the edge and overshoot-undershoot suppression at the same time.

In the technology disclosed in Japanese Patent Application Laid-open No. 2005-333530, a little overshoot-undershoot is necessary to achieve edge enhancement. Consequently, contour processing needs to be done twice, the first time followed by overshoot-undershoot removal and the second time followed by overshoot-undershoot generation. Thus, if the input image has a smooth contrast variation, the resulting image after two rounds of edge enhancement loses contrast and has a jaggy (aliasing) appearance with a sharp contour.

SUMMARY OF THE INVENTION

It is an object of the present invention to at least partially solve the problems in the conventional technology.

According to an aspect of the present invention, an image processing apparatus that receives image data as first image data, applies edge enhancement to the first image data to obtain a second image data, and corrects a pixel value of a target pixel in the second image data, includes a target-area setting unit that sets, in the first image data, a target area around a pixel corresponding to the target pixel, and a pixel-value correcting unit that corrects the pixel value of the target pixel based on pixel values of pixels in the target area.

According to another aspect of the present invention, an image processing method for correcting a pixel value of a target pixel in image data, includes receiving image data as first image data, applying edge enhancement to the first image data to obtain a second image data, setting, in the first image data, a target area around a pixel corresponding to the target pixel in the second image data, and correcting the pixel value of the target pixel based on pixel values of pixels in the target area.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the embodiments, the present invention is applied to, for example, an image processing apparatus of a color image display apparatus such as a color television or a color display of a personal computer, in which pixel values of pixels forming a screen image represent hue, luminance or brightness, and red, blue and green (RGB) colors.

Before describing the embodiments, problems in contour processing or edge enhancement, which the present embodiment addresses, as well as problems in the conventional overshoot-undershoot process are described.

Figure 1:
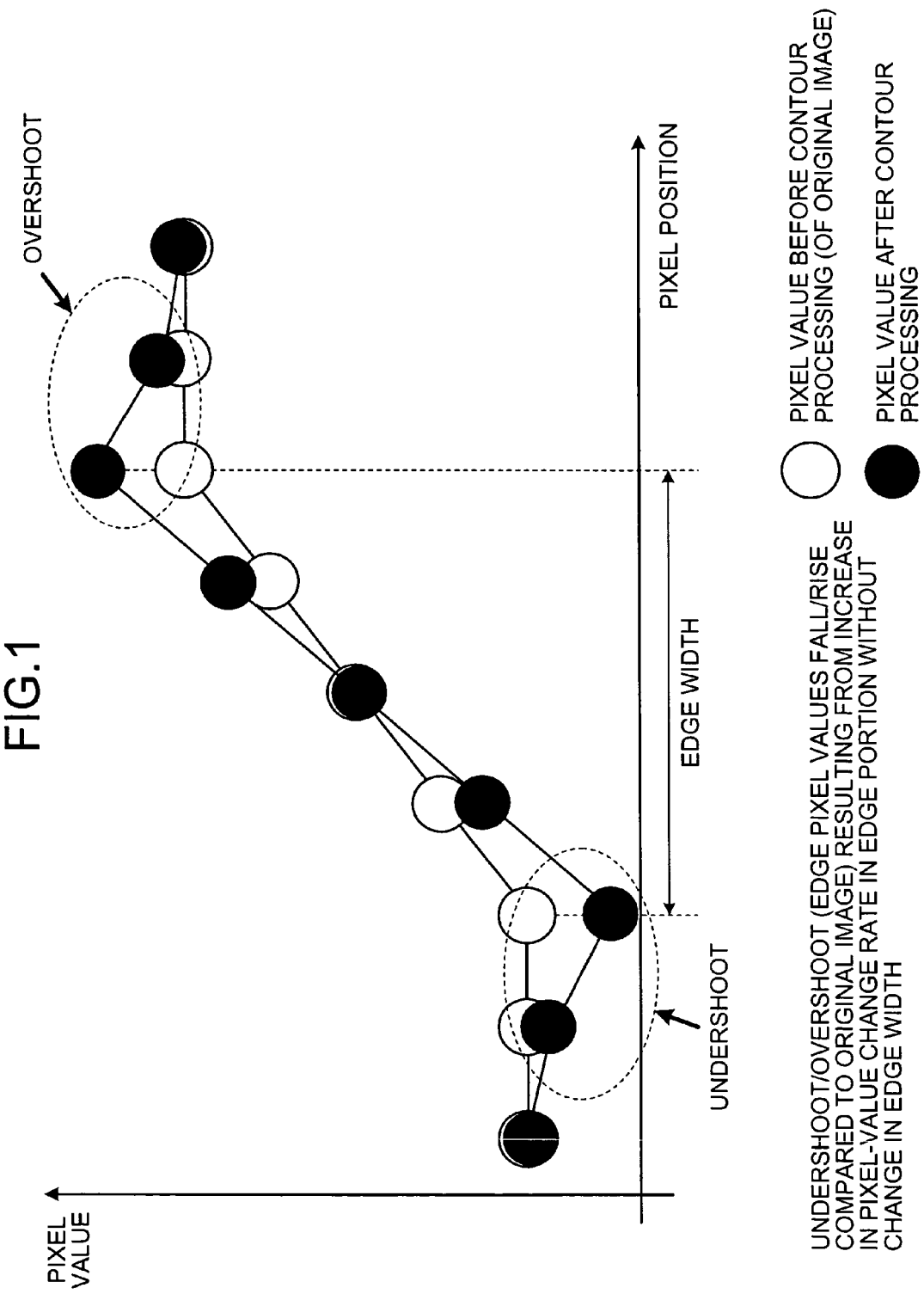
FIG. 1 is a schematic for explaining problems in contour processing.

FIG. 1 is a schematic for explaining the problems with contour processing. Pixel values of pixels at the edges vary according to the position of the pixels. Contour processing is a process to enhance the variation in the pixel values. If the pixel values of the pixels at the edges vary smoothly (i.e., if the rate of change is low) according to the position of the pixels, the image contour of the image does not look distinct and image clarity is compromised. On the other hand, if the pixel values of the pixels at the edges vary sharply (i.e., if the rate of change is high), the image contour appears distinct, and a sharp image is obtained. The process of increasing the sharpness of the edges is called contour processing.

As shown in FIG. 1, the contour can be made sharper by increasing the rate of change of the pixel values in the edge region (i.e., enhance the edge) while maintaining the edge width, making the edge gradient steeper than that of the original image before image processing. However, at the two ends of the edge, the pixel values fall below or rise above those in the original image, resulting in undershoot or overshoot. The pixel value after image processing is higher in the overshot portion than the pixel value of the original image, the overshot portion having a relatively high hue, brightness, and RGB value and appearing relatively whiter than the surrounding area. On the other hand, the pixel value after image processing is lower in the undershot portion than the pixel value of the original image, the undershot portion having a relatively low hue, brightness, and RBG values and appearing relatively blacker than the surrounding area.

Thus, overshoot and undershoot result from performing edge enhancement while maintaining the edge width, which causes the pixel value to rise or fall in the ends of the edge by the sharpened gradient of the edge. Thus, undershoot and overshoot are an inevitable result of the conventional contour processing, forming a white and black border at both ends of the edge.

Figure 2:
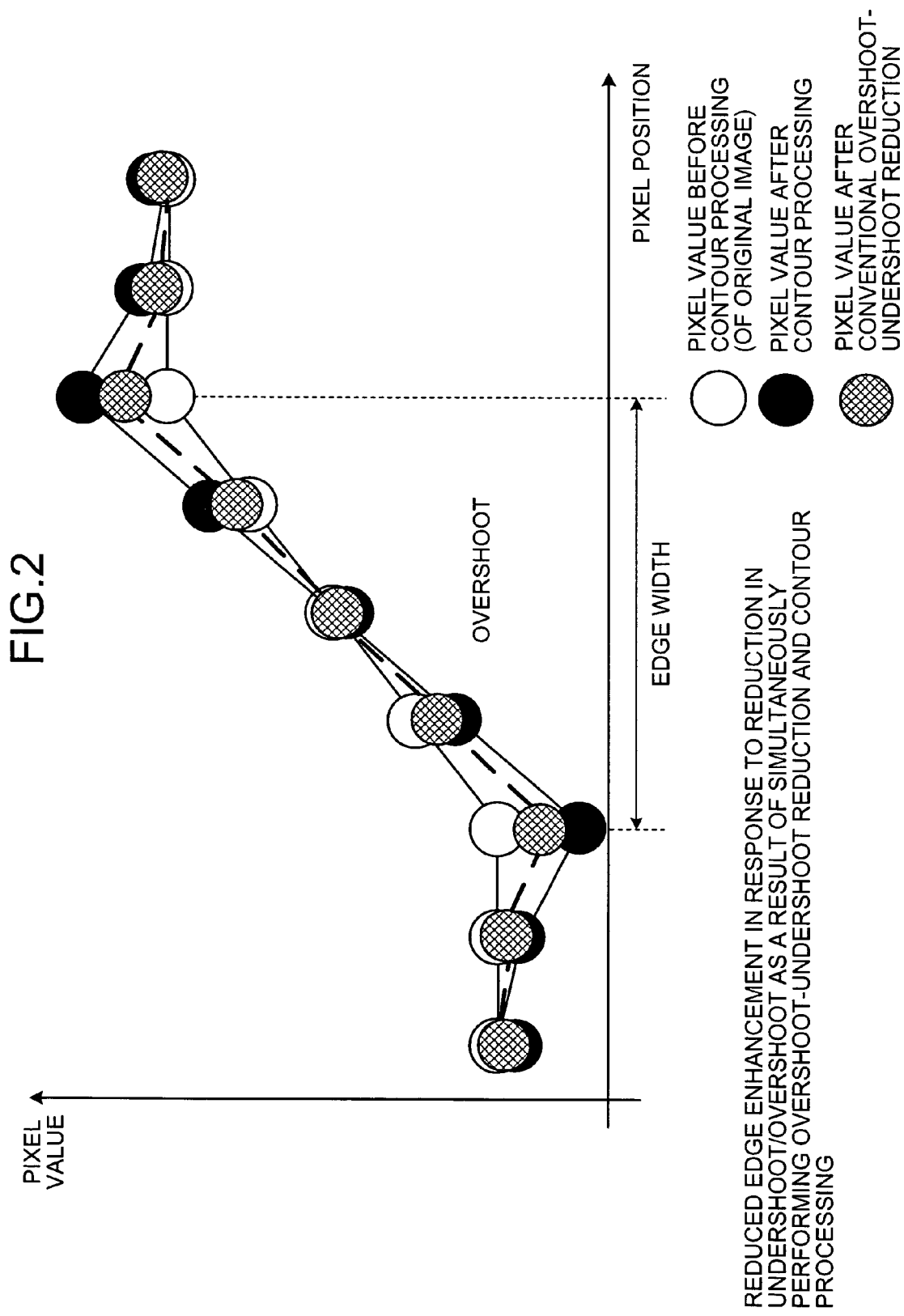
FIGS. 2 and 3 are schematics for explaining problems in the conventional overshoot-undershoot suppression process.

Various conventional methods are available for suppressing overshoot and undershoot. One method, for example, proposes contour processing to be performed simultaneously with overshoot-undershoot reduction. However, as shown in FIG. 2, in this method, when overshoot-undershoot reduction is carried out, the sharpness of the contour edge also reduces.

Another method proposes first performing contour processing, followed by overshoot-undershoot suppression, followed again by contour processing, and finally adding a little overshoot and undershoot to ultimately obtain a contour-processed and overshoot-undershoot suppressed image.

Figure 3:
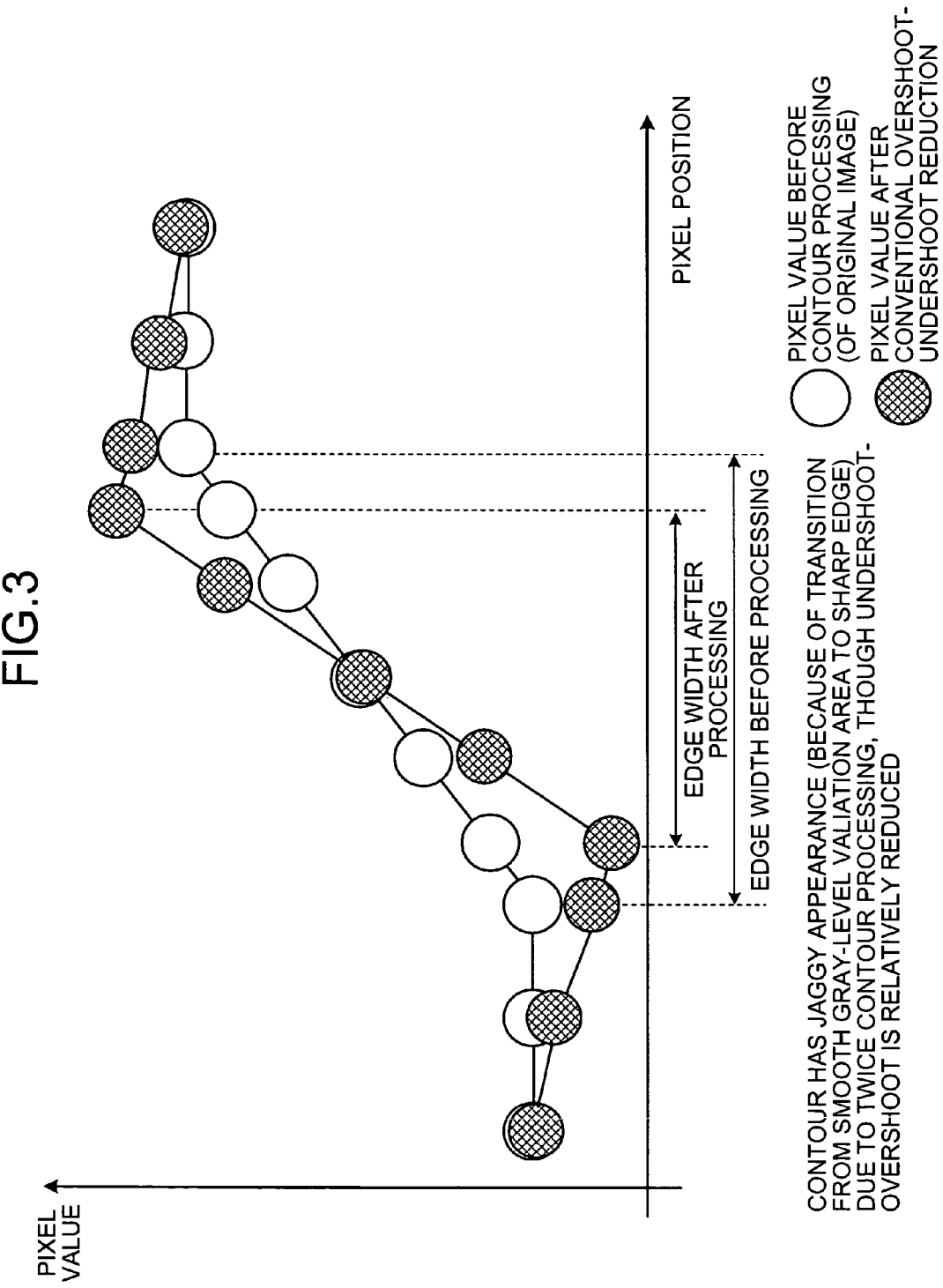

However, in this method, to suppress overshoot and undershoot, the pixel value of the target pixel is modified by a median selected from among three pixel values that include the maximum pixel value and the minimum pixel value of the pixels around the target pixel and the pixel value of the target pixel. As a result, if the contour of the original image has a smooth edge, the contour made sharp by contour processing in the undershot-overshot areas reverts to the original smooth edge. Further, contour processing is performed twice in this method. As a result, as shown in FIG. 3, the contour-processed image has a jaggy appearance as smooth contrast variation is transformed to a sharp edge.

Figure 4:
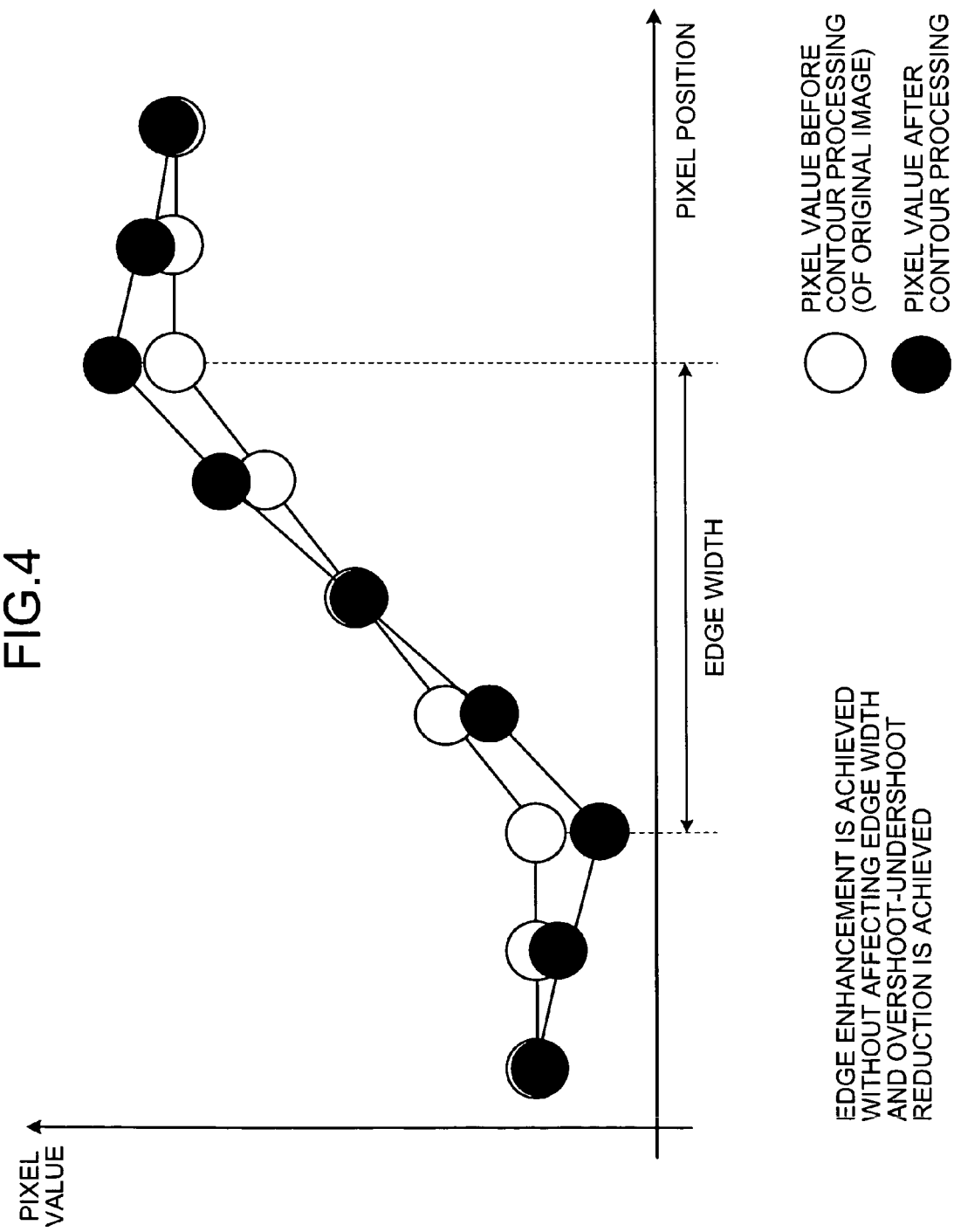
FIG. 4 is a schematic for explaining a feature of an overshoot-undershoot suppression process according to an embodiment of the present invention.

To overcome the problems in the conventional technologies, in the present invention, when image data is received, edge enhancement is applied to the image data. The pixel value of a target pixel in the image data is corrected based on the pixel values of pixels around the target pixel in the image data before the edge enhancement. Thus, as shown in FIG. 4, the edge is enhanced and overshoot and undershoot are suppressed while the edge width is maintained.

Figure 5:
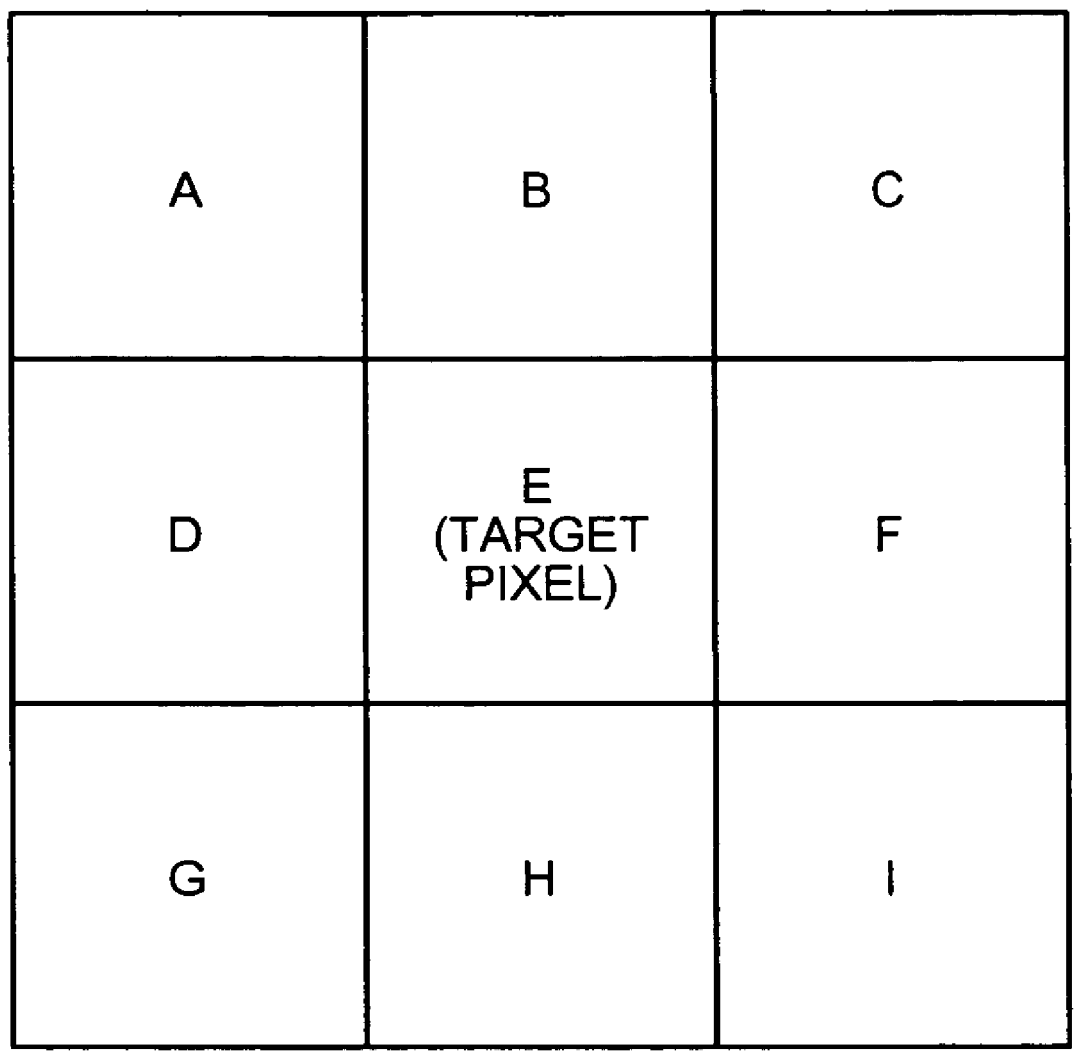
FIG. 5 is an example of a target image range to be processed by an image processing apparatus according to a first embodiment of the present invention.

A first embodiment of the present invention is described below with reference to FIG. 5 to FIG. 8. FIG. 5 is a schematic of a target image range to be processed by the image processing apparatus according to the first embodiment. The term image range refers to a portion of the image that includes the target pixel and the pixels adjacent to the target pixel on all sides. In the first embodiment, as shown in FIG. 5, the image range is represented by pixels forming a 3×3 matrix 2 with a pixel E at the center representing the target pixel. Thus, the pixel E in the image data is the target pixel to be processed by the image processing apparatus, pixels A, B, C, D, F, G, H, and I are pixels adjacent to the pixel E. In the image processing apparatus and the image processing method according to the first embodiment, when the image data is received as input, edge enhancement is applied to the image data. The pixel value of the pixel E, which is the target pixel in the image data, is modified based on the pixel values of the pixels A, B, C, D, F, G, H, and I, which are the pixels adjacent to the target pixel E and in the matrix of 3×3.

The image range can be square matrix of n×n pixels and can include n pixels adjacent to the target pixel on all sides or can be of any shape.

Figure 6:
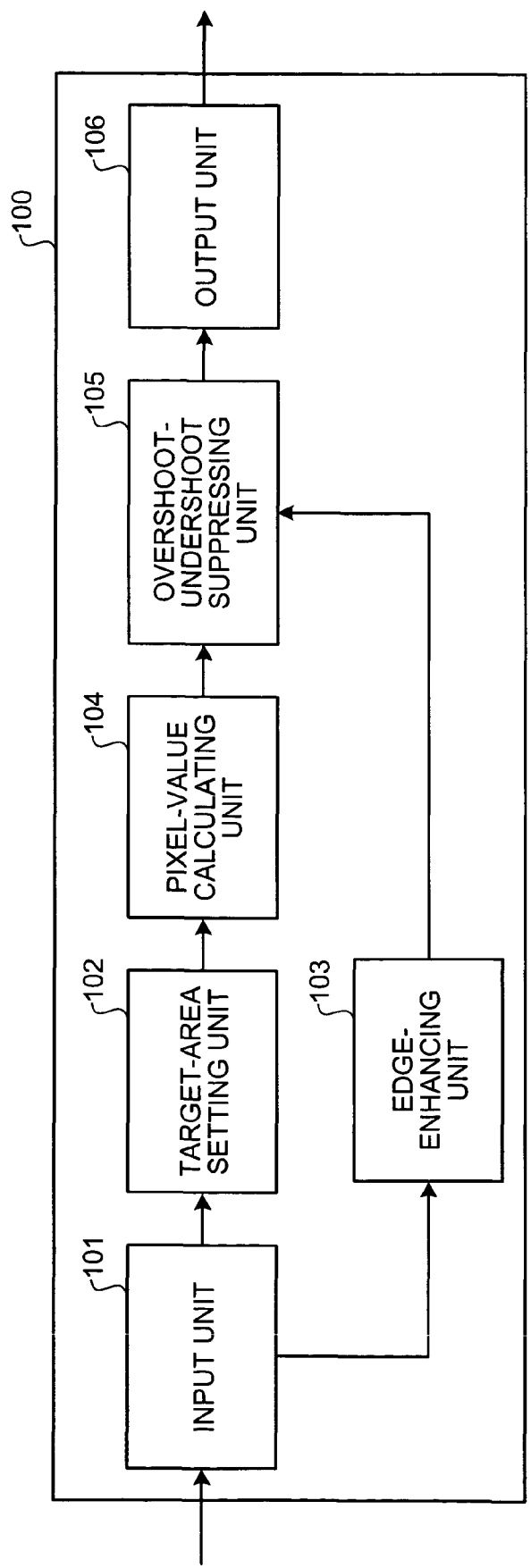
FIG. 6 is a functional block diagram of the image processing apparatus.

FIG. 6 is a functional block diagram of an image processing apparatus 100 according to the first embodiment. The image processing apparatus 100 includes an input unit 101, a target-area setting unit 102, an edge-enhancing unit 103, a pixel-value calculating unit 104, an overshoot-undershoot suppressing unit 105, and an output unit 106.

The input unit 101 is an interface that receives image signals from an external device. The input unit 101 and an output unit of an external image-signal input device can be connected to enable image signals to be passed on. The image signal received from the external device is passed on to the target-area setting unit 102 and the edge-enhancing unit 103.

The target-area setting unit 102 sets the image range, i.e., the pixels adjacent to the target pixel, to be processed in the image data received from the input unit 101 according to the criterion described earlier. The target-area setting unit 102 passes on the image range to be processed to the pixel-value calculating unit 104.

The edge-enhancing unit 103 performs edge enhancement on the original image based on the image data received from the input unit 101. Specifically, the edge-enhancing unit, 103 performs edge enhancement by sharpening the edge of the original image. The edge-enhancing unit 103 then passes on the edge-enhanced image data to the overshoot-undershoot suppressing unit 105.

The pixel-value calculating unit 104 calculates the maximum pixel value and the minimum pixel value from among the pixels in the target image range set by the target-area setting unit 102, and passes on the maximum pixel value and the minimum pixel value to the overshoot-undershoot suppressing unit 105. The pixel-value calculating unit 104 compares the pixel values based on three parameters, namely, the hue that indicates shading of the pixel, the luminance that indicates brightness of the pixel, and the RGB value that indicates the color of the pixel.

Instead of the maximum and minimum pixel values, the pixel-value calculating unit 104 can calculate and output nth largest and nth smallest pixel value, where n is a natural number.

The overshoot-undershoot suppressing unit 105 modifies the pixel value of the edge-enhanced image data received from the edge-enhancing unit 103 based on the maximum pixel value and the minimum pixel value received from the pixel-value calculating unit-104 and suppresses overshoot and undershoot, creating an overshoot-undershoot suppressed image data. The overshoot-undershoot suppressing unit 105 passes on the overshoot-undershoot suppressed image data to the output unit 106.

The output unit 106 is an interface that outputs the image signal to an external device. The output unit 106 and an input unit of an external image signal receiving device can be connected to enable image signals to be passed on.

Figure 7:
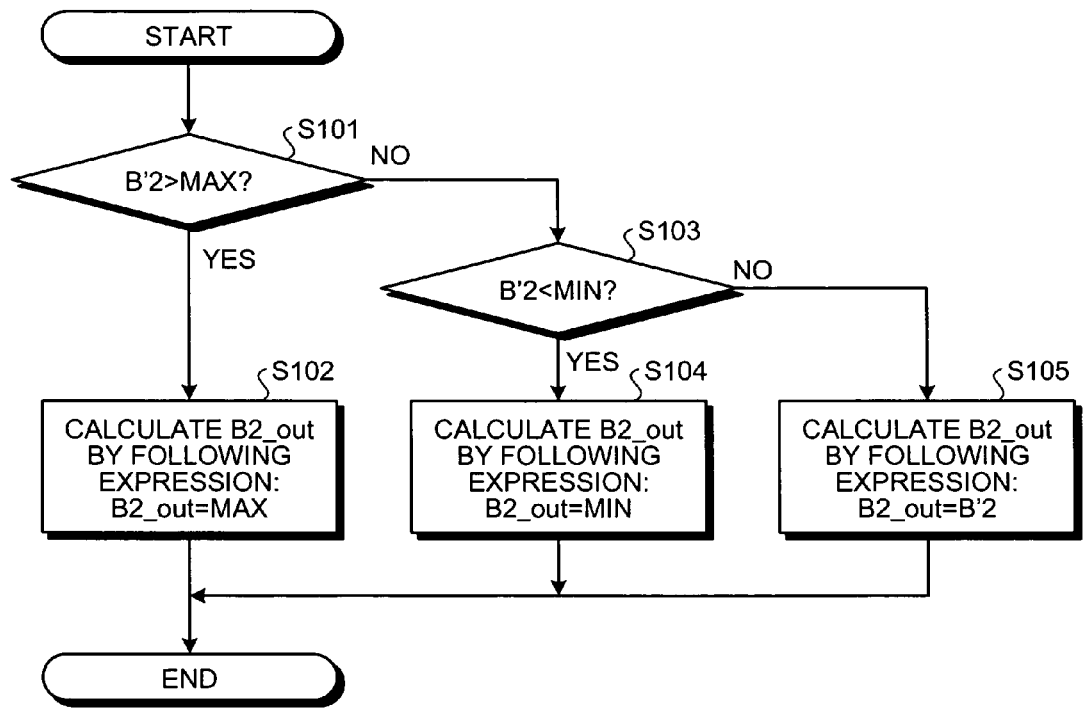
FIG. 7 is a flowchart of an overshoot-undershoot suppression process according to the first embodiment.

FIG. 7 is a flowchart of an overshoot-undershoot suppression process according to the first embodiment. The overshoot-undershoot suppression process is performed on the pixels in an area around the target pixel set by the target-area setting unit 102.

The maximum pixel value and the minimum pixel value output by the pixel-value calculating unit 104 are denoted by MAX and MIN, respectively. If the pixel-value calculating unit 104 outputs the nth largest and the nth smallest pixel values, they are denoted by MAX(n) and MIN(n), respectively. The image signal produced after edge enhancement by the edge-enhancing unit 103 is denoted by B'2 and the image signal produced after the overshoot-undershoot suppression process by the overshoot-undershoot suppressing unit 105 is denoted by B2_out.

As shown in FIG. 7, the image processing apparatus 100 first checks whether B'2 is greater than MAX (step S101). If B'2 is greater than MAX (Yes at step S101), the image processing apparatus 100 concludes that B2_out=MAX (step S102).

If B'2 is not greater than MAX, the image processing apparatus 100 checks if B'2 is smaller than MIN (step S103). If B'2 is smaller than MIN (Yes at step S103), the image processing apparatus 100 concludes that B2_out=MIN (step S104), and if B'2 is not smaller than MIN (No at step S103), concludes that B2_out=B'2 (step S105).

Figure 8:
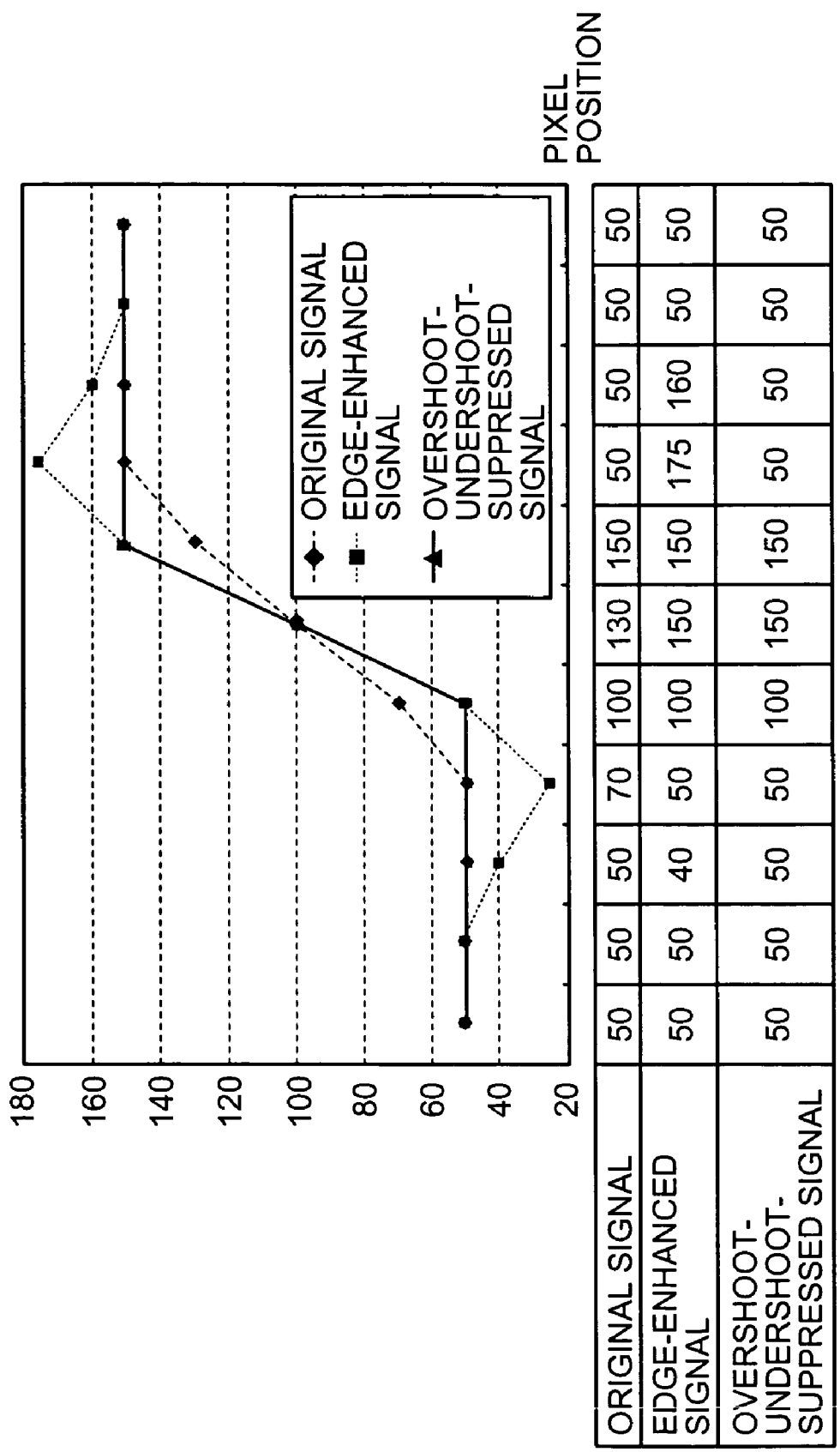
FIG. 8 is a schematic for explaining the overshoot-undershoot suppression process according to the first embodiment.

FIG. 8 is a set consisting of a graph and a table for explaining the output signal obtained after the overshoot-undershoot suppression process on an original image signal that has been edge-enhanced. In the example shown in FIG. 8, the overshoot-undershoot suppression process is performed using the maximum pixel value and the minimum pixel value (n=1) from among the pixels around the target pixel of the original image. Thus, by changing the pixel value of the target pixel to either maximum pixel value or minimum pixel value, the prominence of the pixel values can be suppressed, which achieves overshoot-undershoot suppression without reducing the sharpness of the edge (contour).

Figure 9:
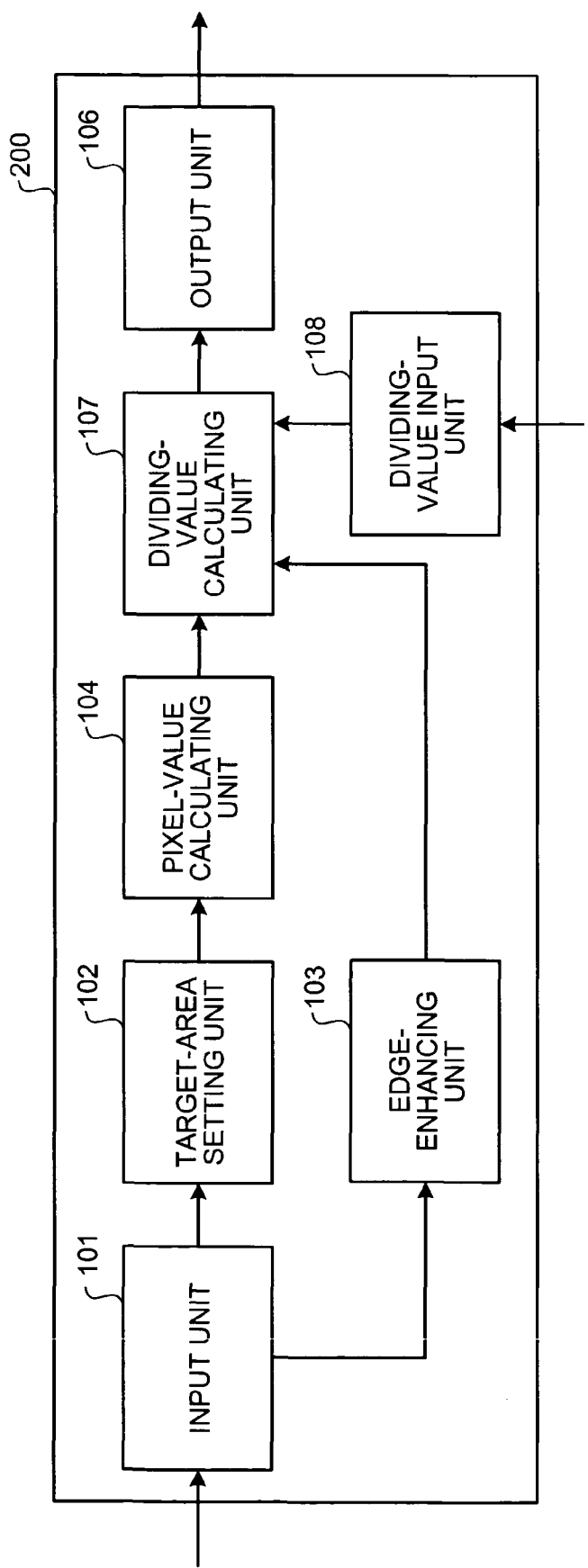
FIG. 9 is a functional block diagram of an image processing apparatus according to a second embodiment of the present invention.

A second embodiment of the present invention is described below with reference to FIG. 9 to FIG. 11. The target image range processed by an image processing apparatus according to the second embodiment is identical to that of the first embodiment. FIG. 9 is a functional block diagram of an image processing apparatus 200 according to the second embodiment. The image processing apparatus 200 includes the input unit 101, the target-area setting unit 102, the edge-enhancing unit 103, the pixel-value calculating unit 104, a dividing-value calculating unit 107, a dividing-value input unit 108, and the output unit 106.

The input unit 101, the target-area setting unit 102, the edge-enhancing unit 103, the pixel-value calculating unit 104, and the output unit 106 are functionally identical to those in the first embodiment.

The dividing-value calculating unit 107 calculates an internally dividing value or point between the maximum pixel value or the minimum pixel value received from the pixel-value calculating unit 104 and the pixel value of the target pixel of the edge-enhanced image data received from the edge-enhancing unit 103 based on an input parameter specifying an internally dividing value input via the dividing-value input unit 108, and modifies the pixel value of the target pixel using the calculation result. The calculation result is passed on to the output unit 106.

Figure 10:
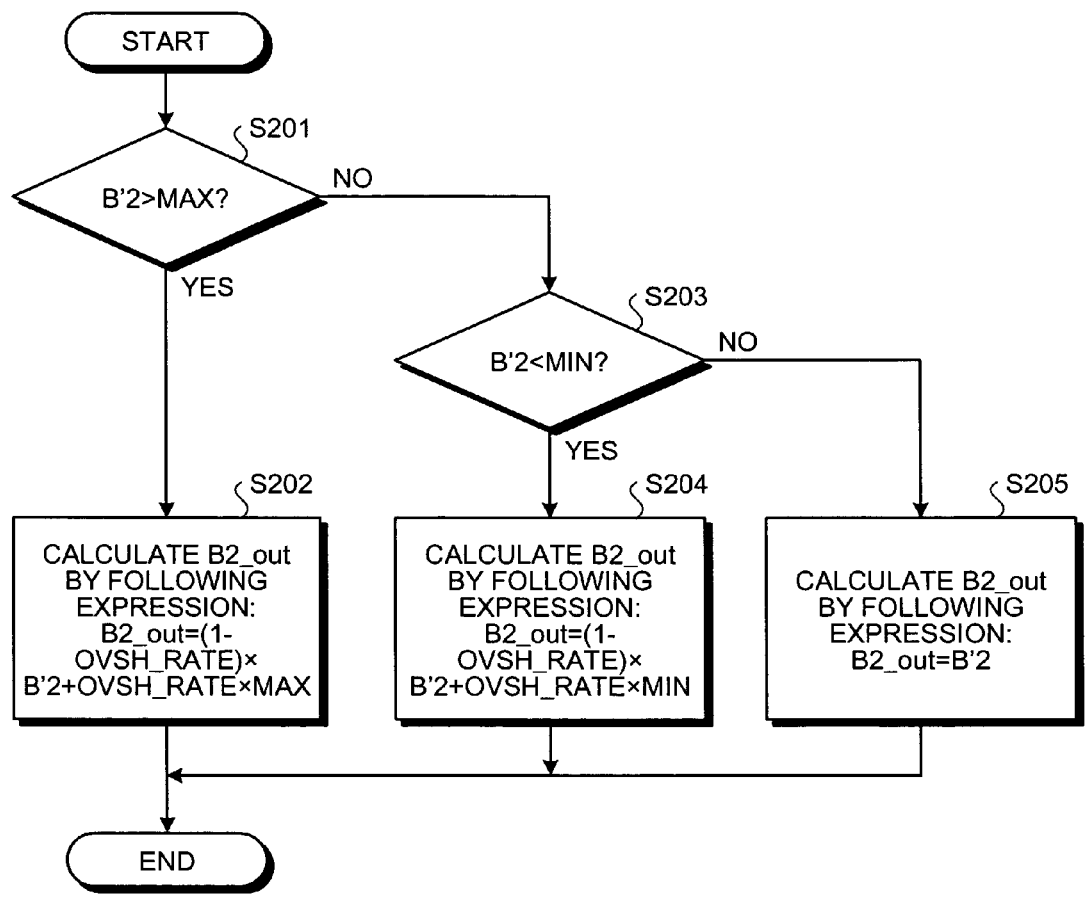
FIG. 10 is a flowchart of an overshoot-undershoot suppression process according to the second embodiment.
Figure 11:
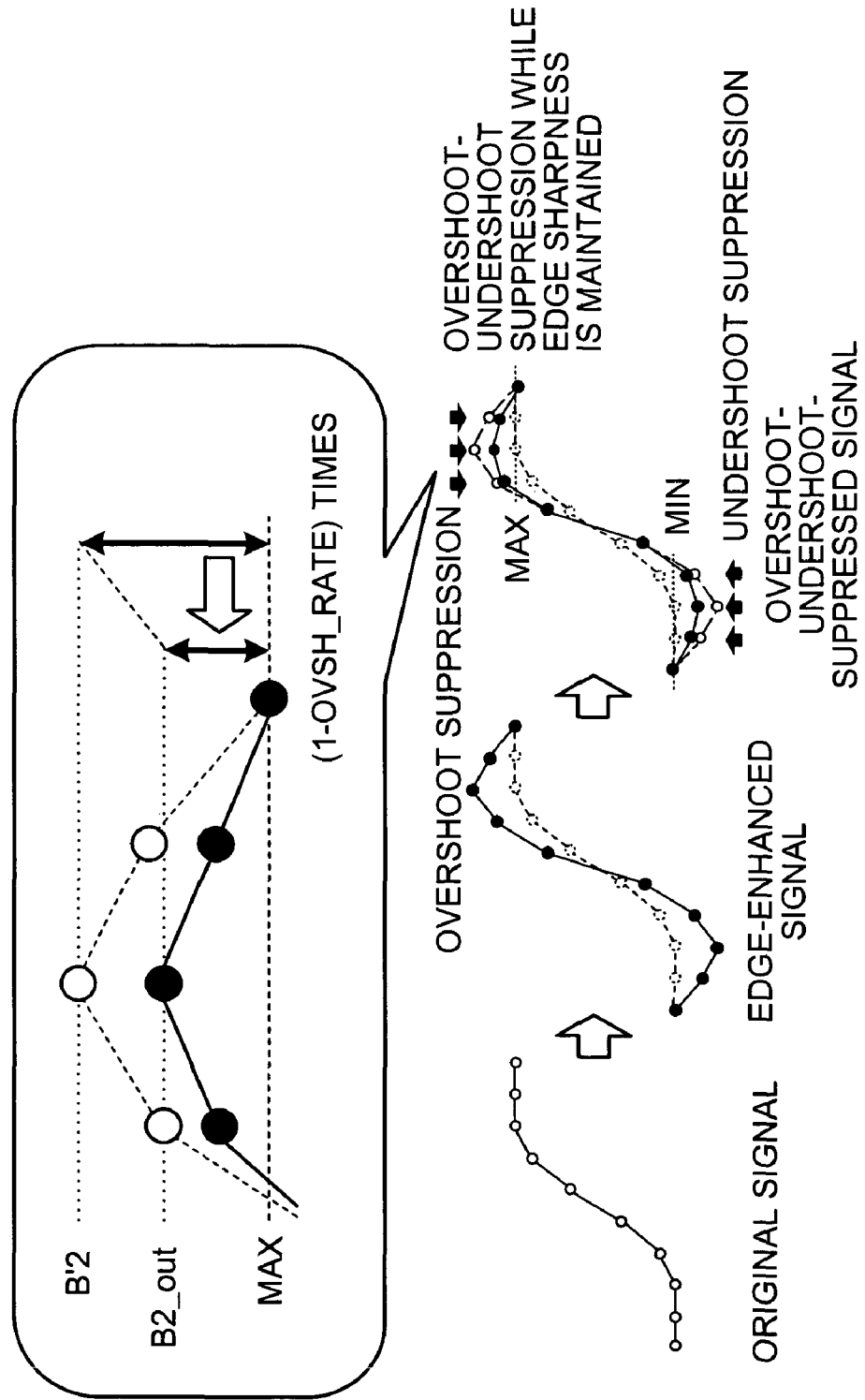
FIGS. 11 and 12 are schematics for explaining the overshoot-undershoot suppression process according to the second embodiment.

FIG. 10 is a flowchart of an overshoot-undershoot suppression process according to the second embodiment. The overshoot-undershoot suppression process is performed on the pixels in the area around the target pixel set by the target-area setting unit 102.

As in the first embodiment, the maximum pixel value and the minimum pixel value output by the pixel-value calculating unit 104 are denoted by MAX and MIN, respectively. The image signal produced after edge enhancement by the edge-enhancing unit 103 is denoted by B'2 and the image signal produced after the overshoot-undershoot suppression process by the dividing-value calculating unit 107 is denoted by B2_out. An input parameter specifying the internally dividing value input via the dividing-value input unit 108 is denoted by OVSH_RATE ($0 \leq OVSH\_RATE \leq 1$).

As shown in FIG. 10, the image processing apparatus 200 first checks whether B'2 is greater than MAX (step S201). If B'2 is greater than MAX (Yes at step S201), the image processing apparatus 200 concludes that B2_out=(1−OVSH_RATE)×B'2+OVSH_RATE×MAX (step S202) If B'2 is not greater than MAX, the image processing apparatus 200 checks if B'2 is smaller than MIN (step S203) If B'2 is smaller than MIN (Yes at step S203), the image processing apparatus 200 concludes that B2_out=(1−OVSH_RATE)×B'2+OVSH_RATE×MIN (step S204), and if B'2 is not smaller than MIN (No at step S203), concludes that B2_out=B'2 (step S205).

Thus, if the pixel value of the target pixel is not in the range between the maximum pixel value and the minimum pixel value of the target area, the pixel value is modified to an internally dividing value between the maximum pixel value or the minimum pixel value and the pixel value of the target pixel. Thus, the prominence of the pixel values can be suppressed as shown in FIG. 11, and overshoot-undershoot suppression can be achieved without affecting the sharpness of the edge (contour).

For any given target pixel, the internally dividing value is calculated based on the same ratio. Hence, the pixel value can be better suppressed as it gets further from the maximum pixel value or the minimum pixel value. Therefore, a more effective overshoot-undershoot suppression can be achieved without affecting the sharpness of the edge (contour).

The degree of overshoot-undershoot suppression can be optimized by modifying the input parameter OVSH_RATE so that an image having a visually appealing contour can be obtained by achieving a balance between overshoot-undershoot and preservation of edge sharpness. The preferred range of OVSH_RATE is 0.5-0.8.

Figure 12:
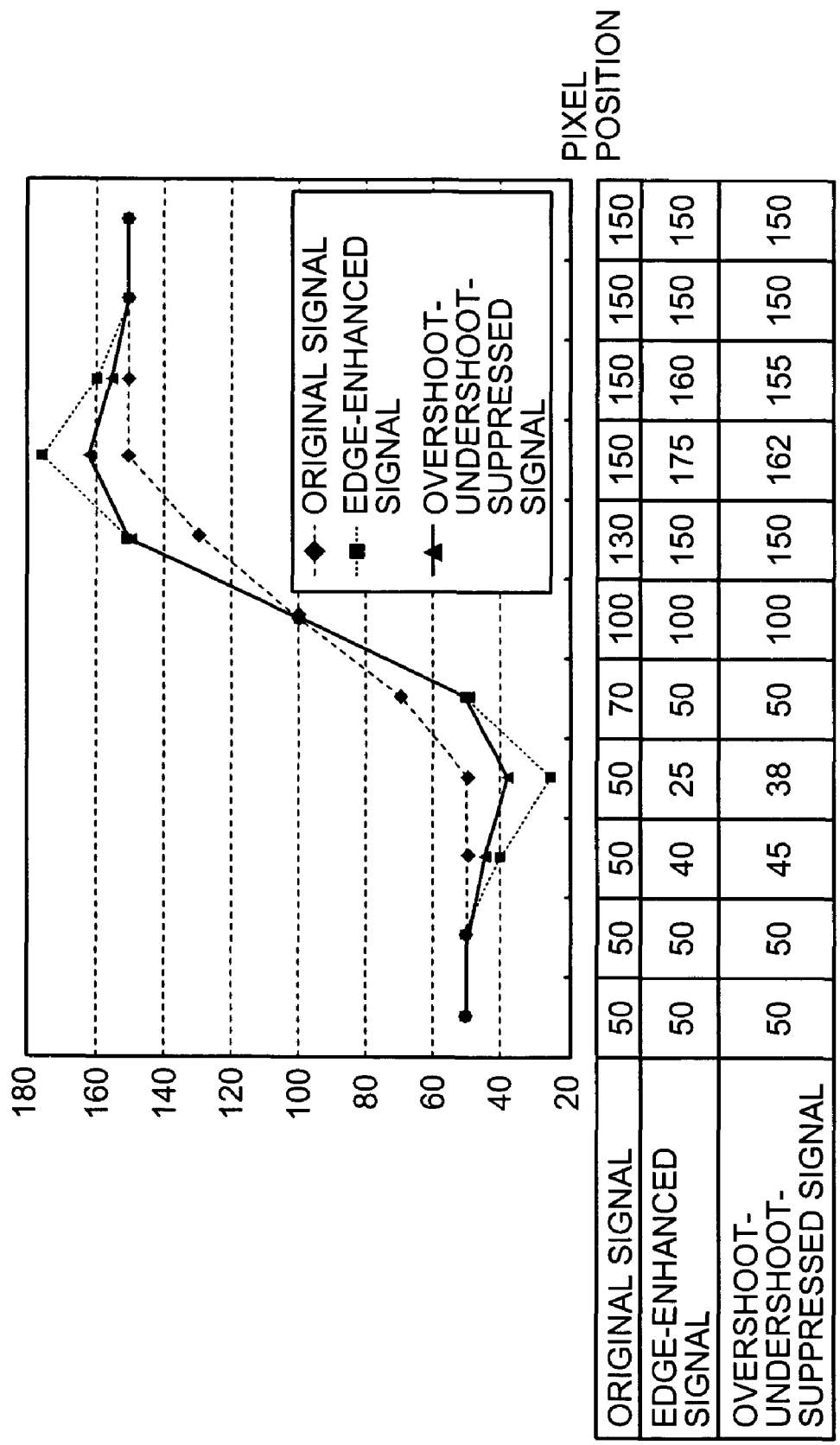

FIG. 12 is a set consisting of a graph and a table for explaining an overshoot-undershoot suppression process signal obtained by calculation of the internally dividing value between the maximum pixel value or the minimum pixel value and an original image signal that has been edge enhanced. The OVSH_RATE is set as 0.5 in the example. Thus, the output signal obtained by the internal division produces optimized overshoot-undershoot, which preserves edge sharpness, yielding a natural and sharp-contoured image.

Figure 13:
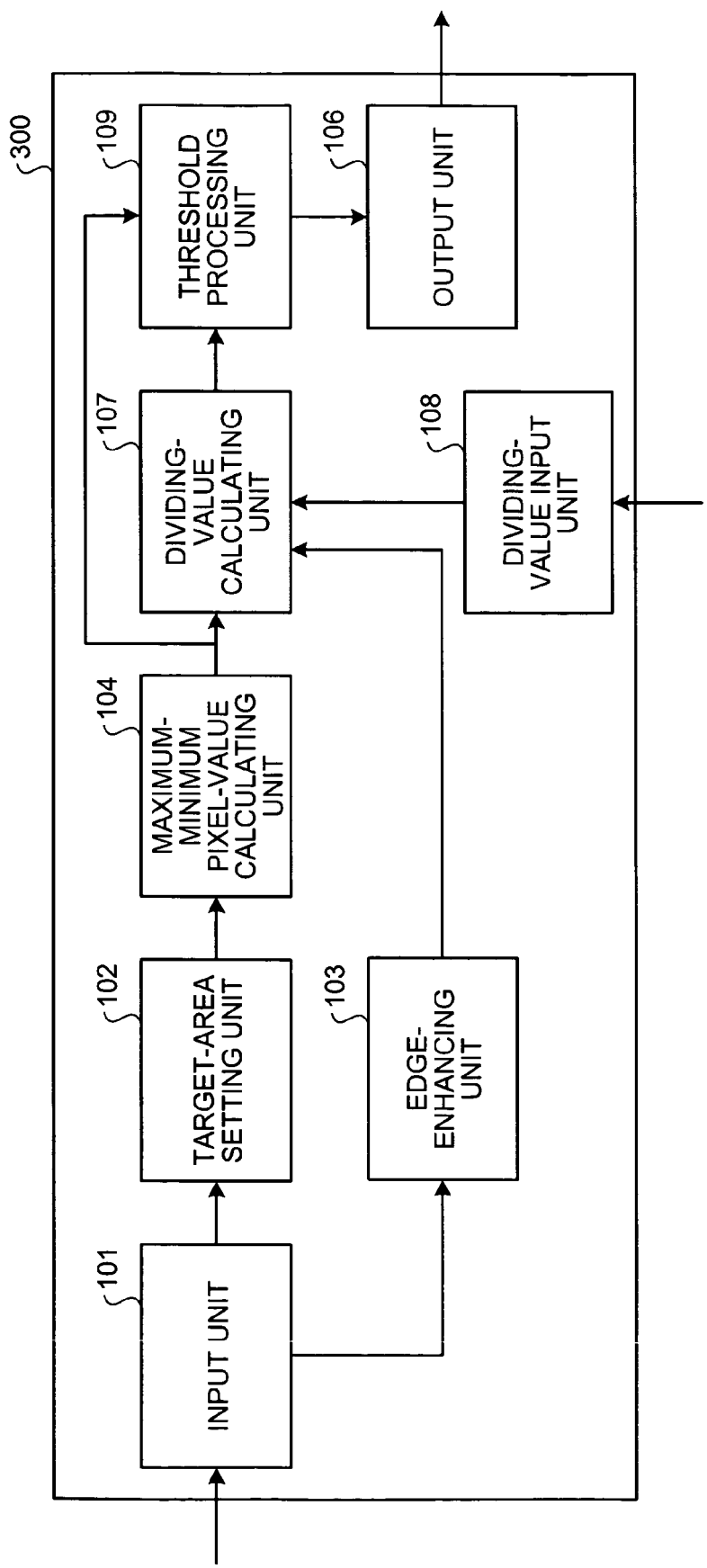
FIG. 13 is a functional block diagram of an image processing apparatus according to a third embodiment of the present invention.

A third embodiment of the present invention is described below with reference to FIG. 13 to FIG. 16. The target image range processed by an image processing apparatus according to the second embodiment is identical to that of the first embodiment and the second embodiment. FIG. 13 is a functional block diagram of an image processing apparatus 300 according to the third embodiment. The image processing apparatus 300 includes the input unit 101, the target-area setting unit 102, the edge-enhancing unit 103, the pixel-value calculating unit 104, the dividing-value calculating unit 107, the dividing-value input unit 108, a threshold processing unit 109, and the output unit 106.

The input unit 101, the target-area setting unit 102, the edge-enhancing unit 103, the pixel-value calculating unit 104, the output unit 106, the dividing-value calculating unit 107, and the dividing-value input unit 108 are functionally identical to those in the second embodiment.

The dividing-value calculating unit 107 calculates an internally dividing value between the maximum pixel value or the minimum pixel value received from the pixel-value calculating unit 104 and the pixel value of the target pixel of the edge-enhanced image data received from the edge-enhancing unit 103 based on an input parameter specifying an internally dividing value input via the dividing-value input unit 108, and modifies the pixel value of the target pixel using the calculation result. The calculation result is passed on to the threshold processing unit 109.

The threshold processing unit 109 compares the pixel value of the target pixel modified by the dividing-value calculating unit 107 with the maximum pixel value and the minimum pixel value received from the pixel-value calculating unit 104, and if the difference between the target pixel value and the maximum pixel value or the minimum pixel value exceeds a predetermined threshold value, modifies the pixel value again so that the difference is equal to the threshold value. The modified pixel value is passed on to the output unit 106.

Figure 14:
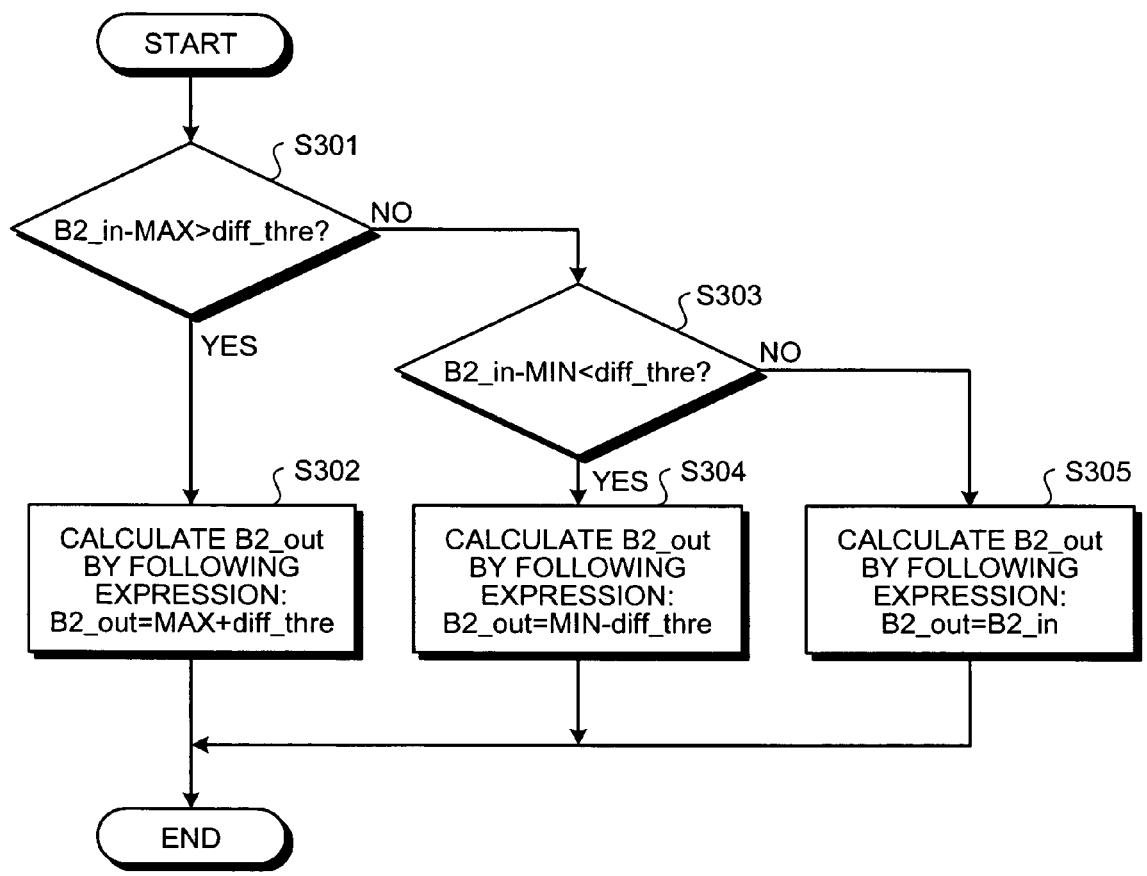
FIG. 14 is a flowchart of an overshoot-undershoot suppression process according to the third embodiment.

FIG. 14 is a flowchart of an overshoot-undershoot suppression process according to the third embodiment. The overshoot-undershoot suppression process is performed on the pixels in the area around the target pixel set by the target-area setting unit 102. The threshold processing unit 109 acts on the image signal processed by the dividing-value-calculating unit 107. The image signal produced after processing by the dividing-value calculating unit 107 corresponds to B2_out of the second embodiment.

As in the first and second embodiments, the maximum pixel value and the minimum pixel value output by the pixel-value calculating unit 104 are denoted by MAX and MIN, respectively. The image signal produced after edge enhancement by the edge-enhancing unit 103 is denoted by B'2 and the image signal produced after processing by the dividing-value calculating unit 107 is denoted by B2_in. An input parameter specifying the internally dividing value input via the dividing-value input unit 108 is denoted by OVSH_RATE ($0 \leq$ OVSH_RATE$\leq 1$). The threshold value of the difference between the maximum pixel value threshold value or the minimum pixel value threshold value previously input via a predetermined input function and the pixel value of the target pixel is denoted by diff_thre.

As shown in FIG. 14, the image processing apparatus 300 first checks whether B2_in-MAX is greater than diff_thre (step S301). If B2_in-MAX is greater than diff_thre (Yes at step S301), the image processing apparatus 300 concludes that B2_out=MAX+diff_thre (step S302).

If B2_in-MAX is not greater than diff_thre (No at step S301), the image processing apparatus 300 checks if B2_in-MIN is smaller than −diff_thre (step S303). If B2_in-MIN is smaller than −diff_thre (Yes at step S303), the image processing apparatus 300 concludes that B2_out=MIN−diff_thre (step S304), and if B2_in-MIN is not smaller than −diff_thre (No at step S303), concludes that B2_out=B2_in (step S305).

Figure 15:
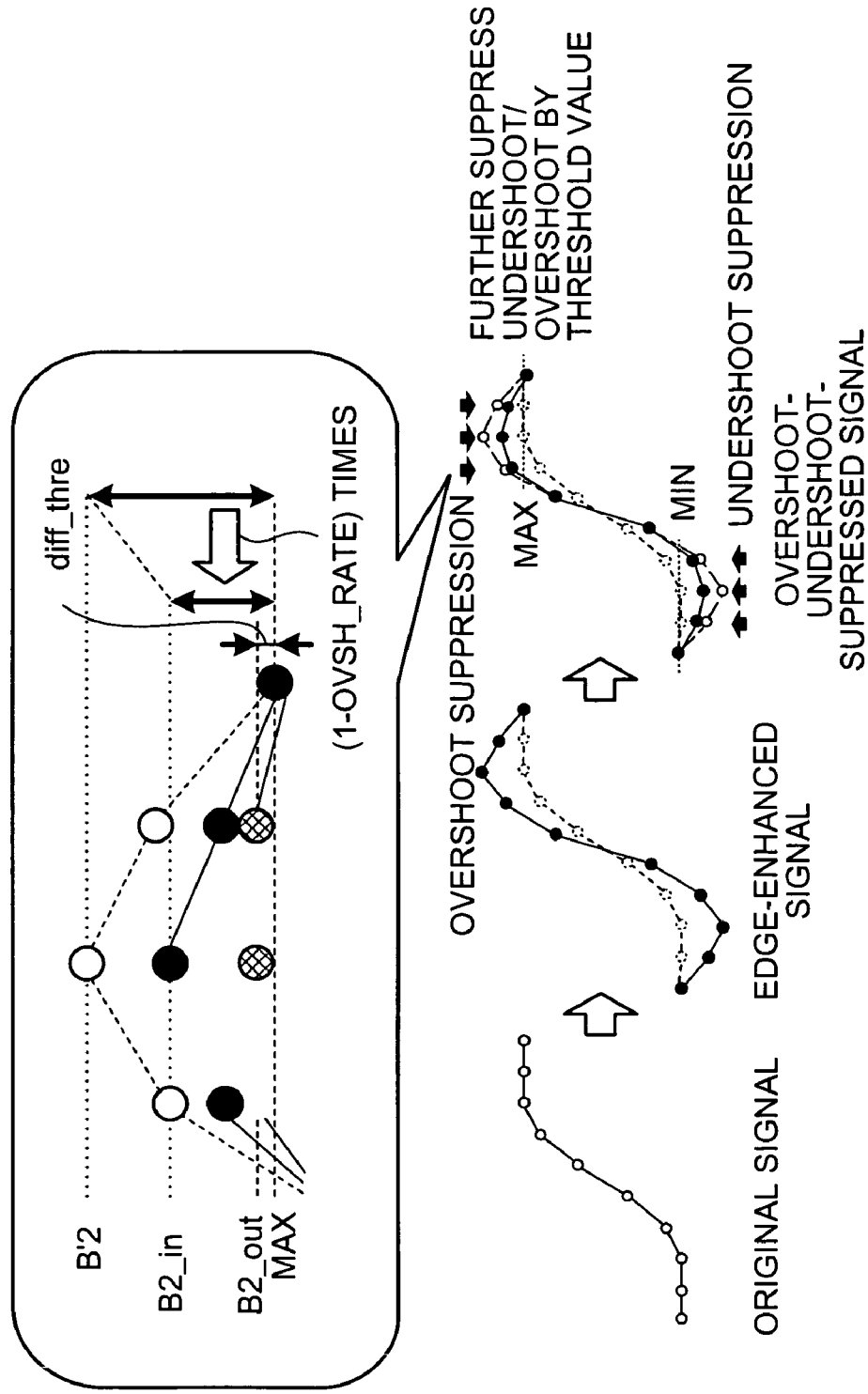
FIGS. 15 and 16 are schematics for explaining the overshoot-undershoot suppression process according to the third embodiment.

Thus, if the difference between the pixel value of the target pixel after it has been subjected to the internal division described in the second embodiment and the maximum pixel value or the minimum pixel value exceeds the threshold value, a threshold process is performed in which the pixel value of the target pixel is modified so that the difference is equal to the threshold value. Consequently, as shown in FIG. 15, the prominence of the pixel values can be blunted, achieving a stronger overshoot-undershoot suppression.

By bringing the difference to be equal to the threshold value, a uniform pixel value is achieved for all the target pixels. However, B2_out can also be obtained by multiplying all the B2_in with the ratio between the pixel value of the target pixel and MAX+diff_thre (or the ratio between the pixel value of the target pixel and MIN−diff_thre). Thus, a smooth threshold process result can be obtained by suppressing any visual discord in the edge portion where overshoot-undershoot suppression is applied.

Figure 16:
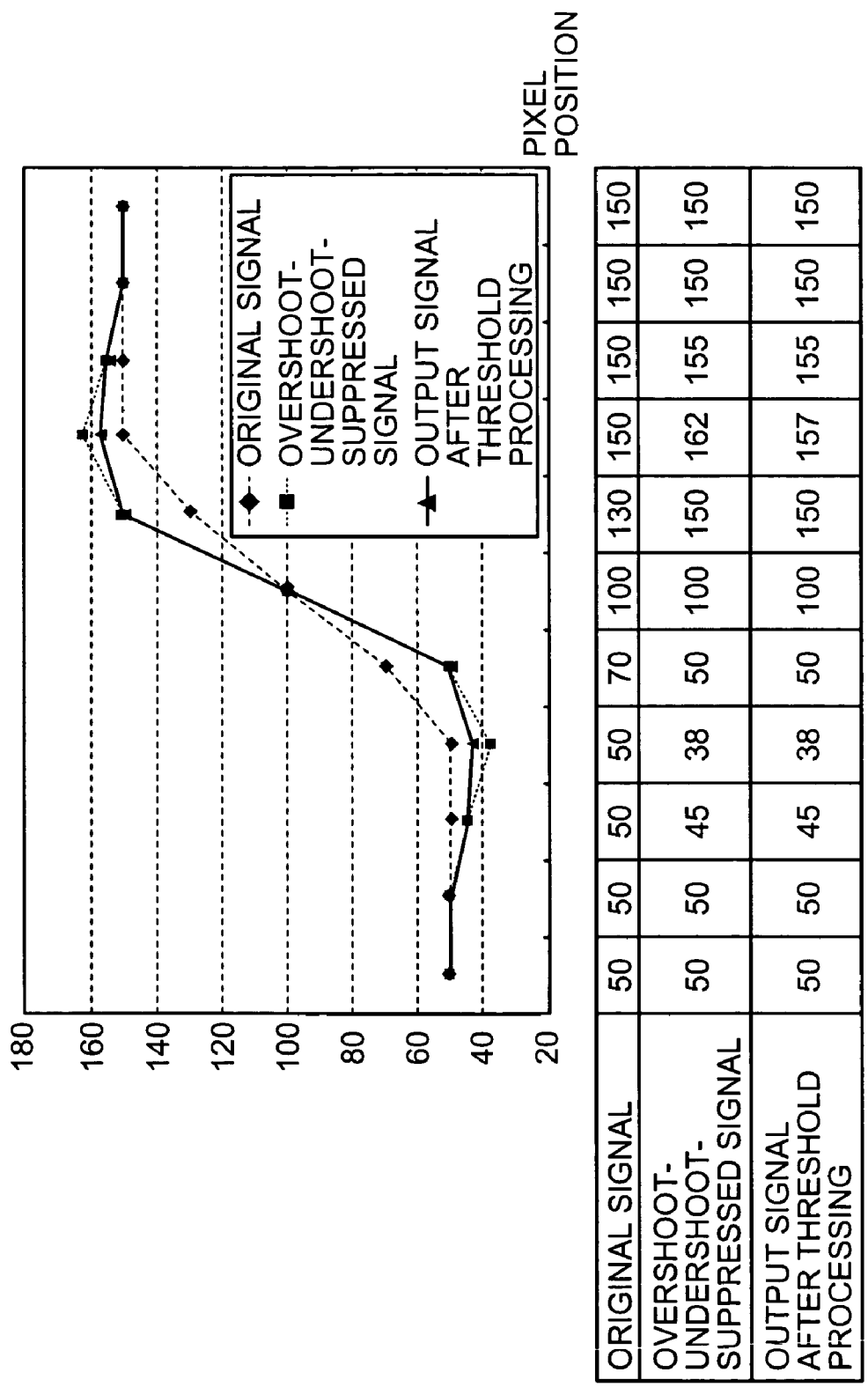

FIG. 16 is a set consisting of a graph and a table for explaining the output signal obtained after the threshold process according to the third embodiment is performed on the image signal that has been subjected to the internal division according to the second embodiment. The threshold diff_thre is taken as 7 in the example. Thus, by performing the threshold process and modifying the pixel values of the pixels around the edge so that their prominence is contained in a specific range, overshoot-undershoot suppression can be performed more minutely.

The various processes described in the embodiments can be implemented by a computer program executed on a computer system such as a personal computer or workstation.

As set forth hereinabove, according to the embodiments of the present invention, a pixel value of a target pixel in an edge-enhanced image data is modified based on pixel values of pixels selected from a target area in an original image data. Alternatively, the pixel value of the target pixel is modified based on an internally dividing pixel value between the pixel values of the pixels selected from the target area and the pixel value of the target pixel. Consequently, both enhanced edge and continuity of pixel values in the image can be achieved, which realizes a properly distinct and sharp contour and suppression of overshoot and undershoot.

Moreover, the pixel value of the target pixel is modified by MAX(n) or MIN(n), or an internally dividing pixel value between MAX(n) or MIN(n) and the pixel value of the target pixel. Thus, both enhanced edge and continuity of pixel values in the image can also be achieved, which realizes a properly distinct and sharp contour and suppression of overshoot and undershoot.

Furthermore, an internally dividing pixel value between a pixel value of a pixel selected from the pixels in the target area in the original image data and the pixel value of the target pixel is used as the pixel value of the target pixel. Besides, the pixel value of the target pixel is modified so that a difference between the pixel values of the pixels in the target area and the pixel value of the target pixel is equal to a predetermined threshold. Thus, a distinct and sharp contour can be obtained while overshoot and undershoot are reliably suppressed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that receives image data as first image data, applies edge enhancement to the first image data to obtain a second image data, and corrects a pixel value of a target pixel in the second image data, the image processing apparatus comprising:
    a target-area setting unit that sets, in the first image data, a target area around a pixel corresponding to the target pixel;
    an extracting unit that extracts a first pixel value of a first pixel in the target area and a second pixel value of a second pixel in the target area, the first pixel value being greater than the second pixel value; and
    a pixel-value correcting unit that corrects the pixel value of the target pixel based on at least one of the first and second pixel values extracted, when the pixel value of the target pixel is greater than the first pixel value or is smaller than the second pixel value.

2. The image processing apparatus according to claim 1, wherein the pixel-value correcting unit corrects the pixel value of the target pixel by replacing the pixel value of the target pixel by one of the first and second pixel values extracted.

3. The image processing apparatus according to claim 1, wherein the pixel-value correcting unit corrects the pixel value of the target pixel based on an internally dividing pixel value between a pixel value of a pixel selected from the target area and the pixel value of the target pixel.

4. The image processing apparatus according to claim 1, wherein
    the extracting unit extracts an nth largest pixel value MAX(n), n being a natural number, of the pixel values of the pixels in the target area as the first pixel value, and extracts an nth smallest pixel value MIN(n) of the pixel values of the pixels in the target area as the second pixel value.

5. The image processing apparatus according to claim 3, wherein
    the pixel-value correcting unit corrects the pixel value of the target pixel based on an internally dividing pixel value between the pixel value of the target pixel and a nth largest pixel value MAX(n), n being a natural number, of the pixel values of the pixels in the target area when the pixel value of the target pixel exceeds the MAX(n), and the pixel-value correcting unit corrects the pixel value of the target pixel based on an internally dividing pixel value between the pixel value of the target pixel and a nth smallest pixel value MIN(n) of the pixel values of the pixels in the target area when the pixel value of the target pixel is less than the MIN(n).

6. The image processing apparatus according to claim 1, wherein the pixel value of target pixel is corrected to an internally dividing pixel value between the pixel value of the target pixel and a pixel value of a pixel selected from the pixels in the target area based on a predetermined criterion.

7. The image processing apparatus according to claim 1, wherein the pixel-value correcting unit adjusts the pixel value of the target pixel so that a difference between a pixel value of a pixel selected from the target area and the pixel value of the target pixel is equal to a predetermined threshold value when the difference exceeds the threshold value.

8. An image processing method for correcting a pixel value of a target pixel in image data, comprising:
    receiving image data as first image data;
    applying edge enhancement to the first image data to obtain a second image data;
    setting, in the first image data, a target area around a pixel corresponding to the target pixel in the second image data;
    extracting a first pixel value of a pixel in the target area and a second pixel value of a second pixel in the target area, the first pixel value being greater than the second pixel value; and
    correcting the pixel value of the target pixel based on at least one of the first and second pixel values extracted, when the pixel value of the target pixel is greater than the first pixel value or is smaller than the second pixel value.

9. The image processing method according to claim 8, wherein, wherein the correcting includes correcting the pixel value of the target pixel based on an internally dividing pixel value between a pixel value of a pixel selected from the target area and the pixel value of the target pixel.

10. A computer-readable recording medium that stores therein a computer program for correcting a pixel value of a target pixel in image data, the computer program causing the computer to execute:
    receiving image data as first image data;
    applying edge enhancement to the first image data to obtain a second image data;
    setting, in the first image data, a target area around a pixel corresponding to the target pixel in the second image data;
    extracting a first pixel value of a pixel in the target area and a second pixel value of a second pixel in the target area, the first pixel value being greater than the second pixel value; and
    correcting the pixel value of the target pixel based on at least one of the first and second pixel values extracted, when the pixel value of the target pixel is greater than the first pixel value or is smaller than the second pixel value.

11. The computer-readable recording medium according to claim 10, wherein the correcting includes correcting the pixel value of the target pixel based on an internally dividing pixel value between a pixel value of a pixel selected from the target area and the pixel value of the target pixel.

12. The image processing apparatus according to claim 3, wherein the pixel-value correcting unit corrects the pixel value of the target pixel by replacing the pixel value of the target pixel by the internally dividing pixel value.

* * * * *